United States Patent
Tan

(10) Patent No.: US 11,383,991 B2
(45) Date of Patent: Jul. 12, 2022

(54) SLUDGE CONCENTRATION AND CONDITIONING DEVICE AND METHOD FOR TREATING SLUDGE USING THE SAME

(71) Applicant: SWISON CREATIVE ENVIRONMENTAL SOLUTIONS CO., LTD., Guangdong (CN)

(72) Inventor: Wei Tan, Guangdong (CN)

(73) Assignee: Swison Creative Environmental Solutions Co., Ltd., Guangdong (CN)

( * ) Notice: Subject to any disclaimer, the term of this patent is extended or adjusted under 35 U.S.C. 154(b) by 588 days.

(21) Appl. No.: 15/940,271

(22) Filed: Mar. 29, 2018

(65) Prior Publication Data

US 2018/0282195 A1 Oct. 4, 2018

(30) Foreign Application Priority Data

Mar. 31, 2017 (CN) .......................... 201710208156.2

(51) Int. Cl.
*C02F 11/12* (2019.01)
*C02F 11/14* (2019.01)
(Continued)

(52) U.S. Cl.
CPC ............ *C02F 1/004* (2013.01); *C02F 11/121* (2013.01); *C02F 11/14* (2013.01); *C02F 1/52* (2013.01);
(Continued)

(58) Field of Classification Search
CPC .... C02F 1/004; C02F 1/52; C02F 1/44; C02F 1/00; C02F 11/121; C02F 11/14;
(Continued)

(56) References Cited

U.S. PATENT DOCUMENTS

2004/0134856 A1 7/2004 Fujii et al.

FOREIGN PATENT DOCUMENTS

| CN | 1320940 C | 6/2007 |
| CN | 103623637 B | 1/2016 |

(Continued)

OTHER PUBLICATIONS

English translated CN 205011601, YE Xinquan, Feb. 2016.*
(Continued)

*Primary Examiner* — Akash K Varma
(74) *Attorney, Agent, or Firm* — Taft Stettinius & Hollister LLP

(57) ABSTRACT

The present invention relates to a sludge concentration and conditioning device, and a method for treating sludge by using the same. To be specific, there is provided a sludge concentration and conditioning device, comprising: a storage device used for receiving and accommodating sludge and including a body and a cover, the body being provided with a sludge outlet and an overflow port, and the cover including a gas outlet for discharging gas; a filtering device disposed between the sludge outlet and the overflow port and used for filtering the sludge so as to achieve solid-liquid separation; a sludge feed device used for conveying sludge from below the filtering device into the storage device; an additive feed device used for conveying an additive from below the filtering device into the storage device; a sludge discharging device connected to the sludge outlet and used for discharging concentrated and conditioned sludge; and a concentrated sludge adjusting device including an adjusting tank in fluid communication with and surrounding the storage device, and used for adjusting the amount of concentrated sludge in the storage device according to the conditioning requirements. The present invention also pro- (Continued)

vides a method for treating sludge by using the sludge concentration and conditioning device.

20 Claims, 6 Drawing Sheets

(51) Int. Cl.
  *C02F 1/00* (2006.01)
  *C02F 11/121* (2019.01)
  *C02F 1/52* (2006.01)
(52) U.S. Cl.
  CPC .. *C02F 2201/005* (2013.01); *C02F 2203/006* (2013.01); *C02F 2301/066* (2013.01); *C02F 2303/06* (2013.01)
(58) Field of Classification Search
  CPC ............... C02F 11/12; C02F 2201/005; C02F 2203/006; C02F 2301/066; C02F 2303/06; B01D 65/02
  USPC ....................................................... 210/738
  See application file for complete search history.

(56) References Cited

FOREIGN PATENT DOCUMENTS

| CN | 205011601 U | * | 2/2016 | ............. C02F 11/12 |
|---|---|---|---|---|
| JP | H0768107 A | | 3/1995 | |
| JP | H07178396 A | | 7/1995 | |
| JP | 2000176496 A | | 6/2000 | |
| JP | 2009011997 A | * | 1/2009 | ............. B01D 65/02 |
| JP | 2009011997 A | | 1/2009 | |

OTHER PUBLICATIONS

English translated JP2009011997, Azuma Toshiyasu, Jan. 2009.*
CN 205011601 U English translation, Feb. 2016, YE Xinquan.*
European Patent Office, Extended Search Report issued in corresponding Application No. 18163603.6, dated Jun. 12, 2018, 7 pp.
Taiwan Patent Office, Office Action issued in corresponding Application No. 107110237, dated Oct. 19, 2020, 17 pp.
Japanese Patent Office, Office Action issued in corresponding Application No. 2018-067051, dated Nov. 24, 2021, 6 pp.
Korean Patent Office, Office Action issued in corresponding Application No. 10-2018-0035806, dated Apr. 15, 2022, 4 pp.

* cited by examiner

SLUDGE CONCENTRATION AND CONDITIONING DEVICE AND METHOD FOR TREATING SLUDGE USING THE SAME

TECHNICAL FIELD

The present invention relates to a sludge treatment device, and more particularly to a sludge concentration and conditioning device for concentrating and conditioning sludge, and a method for concentrating and conditioning sludge by using the sludge concentration and conditioning device.

BACKGROUND ART

Wastewater plants may produce a large amount of sludge while treating wastewater. Sludge particles in the sludge are of the order of micrometer, have a high moisture content, which usually ranges from 99.2% to 99.6%, contain a tremendous number of organic components and are substantially colloidal. Transportation and storage of such sludge with high moisture content are very difficult because the sludge with the high moisture content usually occupies a huge volume, which may result in high transportation and storage costs. Additionally, it is very hard to thoroughly dry such sludge under natural storage conditions, and there also needs so much valuable land to store the sludge over a long period of time. Moreover, the sludge usually contains heavy metals, noxious bacteria and the like, so that it, if treated in a conventional manner (e.g., natural storage or landfill), tends to give rise to hazardous environmental pollution. In order to treat and dispose sludge in a better manner, we need to reduce the moisture content and volume of sludge by means of sludge concentration, which can, on the one hand, reduce the sludge transportation and storage costs, and, on the other hand, facilitate subsequent sludge process and treatment. In the prior art, sludge is usually concentrated by way of gravity concentration, air floatation and centrifugal concentration.

Gravity concentration is to transport sludge to a sludge concentration pool, in which the sludge is settled to the bottom by a natural sedimentation process, and then to remove clear supernatant liquid accordingly. The gravity concentration process by means of natural sedimentation is, however, very time-consuming and usually needs more than ten hours to complete sedimentation and separation. Furthermore, long time consumption will give rise to forming an anaerobic environment in the sludge settled at the pool bottom, thereby rendering dewatered sludge highly phosphorous and not up to effluent standards. A Chinese Utility Model Patent No. CN205011601U provides a sludge concentration pool, which increases the contact between sludge and oxygen by aeration and stirring, and therefore reduces the phosphorous emission in the sludge. However, aeration and stirring make it harder for the sludge to concentrate by way of natural sedimentation and for the supernatant liquid to escape accordingly. Hence, the solution, though reducing the phosphorous emission in the sludge, prolongs the time and lowers the efficiency of sludge concentration, and the concentrated sludge still has high moisture content.

Contrary to gravity concentration, air floatation is to adhere fine bubbles to sludge particles so as to make sludge particles float up to the water surface, and then scrape concentrated sludge into a sludge discharge trough with a scraper and let the sludge water flow out of the pool bottom. The method, however, still has the time-consuming problem. In addition, the method sets requirements for sludge particles, that is, the sludge particles should not be too large, or otherwise bubbles cannot be utilized to float sludge up. Centrifugal concentration has to be done in a specially made centrifugal concentrator, which separates sludge apart from water by utilizing different specific gravity and different centrifugal tendency of solids and liquids in sludge so as to achieve the purpose of concentration. However, centrifugal thickening needs to use a complicated and expensive dedicated equipment, which may lead to higher costs.

Moreover, for effective treatment of sludge with high moisture content, in addition to sludge concentration, sludge conditioning according to the sludge characteristics is also required so as to facilitate subsequent treatment such as mechanical dehydration and desiccation. The reason is that sludge is very hydrophilic, and water in sludge is strongly bonded with sludge particles. Additives can be added to change the properties of sludge, destroy the structure of sludge colloids, reduce hydrophilia of sludge and improve the dewatering performance of sludge. Nevertheless, in the prior art, none of devices used for sludge concentration have the function to condition sludge according to the characteristics of sludge, which severely affects subsequent sludge treatment, reduces sludge treatment capacity and increases production costs.

Therefore, in the field of sludge treatment, it is always desired to provide a device that can concentrate and condition sludge. The device occupies a small area, and can greatly increase the concentration efficiency and shorten the concentration time with an unexpected effect, and meanwhile is structurally simple and easy to clean. Moreover, it is also desired to provide a device for concentrating and conditioning sludge, which can adjust the amount of concentrated sludge while conditioning the sludge, thereby achieving a better conditioning effect.

SUMMARY OF THE INVENTION

The above objects are achieved by the sludge concentration and conditioning device provided by the present invention.

The present invention provides a sludge concentration and conditioning device comprising a storage device for receiving and accommodating sludge, the storage device including a body and a cover that jointly form an interior space of the storage device for receiving and accommodating sludge, the body being provided with a sludge outlet for discharging sludge from the storage device and an overflow port located above the sludge outlet and used for discharging filtrate generated in the sludge concentration process; a filtering device disposed between the sludge outlet and the overflow port within the storage device and used for filtering the sludge within the storage device so as to achieve solid-liquid separation; a sludge feed device used for conveying sludge from below the filtering device into the storage device; an additive feed device used for conveying an additive from below the filtering device into the storage device so as to mix the additive with the sludge; a sludge discharging device connected to the sludge outlet and used for discharging concentrated and conditioned sludge from the storage device; and a concentrated sludge adjusting device including an adjusting tank located below the filtering device and in fluid communication with the storage device, the concentrated sludge adjusting device being used for adjusting the amount of concentrated sludge in the storage device according to the conditioning requirements, wherein the adjusting tank is arranged to surround the body of the storage device.

In another embodiment of the present invention, the concentrated sludge adjusting device further comprises a pump for pumping concentrated sludge and a control valve used for controlling the fluid communication between the adjusting tank and the storage device.

In another embodiment of the present invention, the body of the storage device is a reservoir formed of a recessed area in the ground, the reservoir includes a reservoir wall and a bottom, and the sludge outlet and the outflow port are located in the reservoir wall. In another embodiment of the present invention, the body of the storage device is a container disposed on the ground and including a sidewall and a bottom that are formed of a housing, and the sludge outlet and the outflow port are located in the sidewall. In another embodiment of the present invention, the body of the storage device is a container disposed on the ground and including a sidewall and a bottom that are formed of a housing, the sludge outlet is located in the bottom and the overflow port is located in the sidewall.

In another embodiment of the present invention, the storage device further comprises a sludge inlet located below the filtering device and in the sidewall or bottom of the body, the sludge feed device is connected to the sludge inlet so as to convey sludge from below the filtering device. In another embodiment of the present invention, the sludge feed device includes a sludge feed pipe extending from top to bottom along the sidewall of the body in the storage device to below the filtering device so as to convey sludge from below the filtering device. In another embodiment of the present invention, the cover of the storage device may further include a gas outlet used for discharging gas from the storage device.

In another embodiment of the present invention, the storage device further includes an additive inlet located below the filtering device, and the additive feed device is connected to the additive inlet so as to convey the additive from below the filtering device. In another embodiment of the present invention, the additive feed device includes an additive pipe extending from top to bottom along the body within the storage device to below the filtering device so as to convey the additive from below the filtering device. In another embodiment of the present invention, the sludge concentration and conditioning device further comprises a stirring device used for stirring the sludge in the storage device.

In another embodiment of the present invention, the filtering device of the sludge concentration and conditioning device comprises a support plate including at least one plate hole; a filtering assembly correspondingly disposed at the at least one plate hole in the support plate and including a cage bracket that includes a fastener and a plurality of filtering grids, the fastener being used for joining the filtering assembly to the plate hole of the support plate and the plurality of filtering grids being each connected at one end to the fastener and connected at the other end to one another; and a filter mesh fastened to the cage bracket and surrounding the cage bracket. In another embodiment of the present invention, the at least one plate hole in the support plate is regularly arranged in the support plate. In another embodiment of the present invention, the at least one plate hole in the support plate is irregularly arranged in the support plate. In another embodiment of the present invention, the at least one plate hole in the support plate is in a shape of a circle, a triangle or a polygon. In another embodiment of the present invention, the support plate is a flat plate. In another embodiment of the present invention, the support plate has an upwardly curved convex shape, or a downwardly curved concave shape, or an undulating shape. In another embodiment of the present invention, the filter mesh includes a mesh cylinder and a bottom mesh that are connected to each other so as to jointly surround the cage bracket. In another embodiment of the present invention, the filter mesh is formed into one piece. In another embodiment of the present invention, the cage bracket is provided in its longitudinal direction with at least one reinforcing ring in the middle of the plurality of filtering grids. In another embodiment of the present invention, the plurality of filtering grids can have a length adjustable according to different sludge characteristics and concentration requirements. In another embodiment of the present invention, the filtering device can move up and down so as to adjust the division of the interior space of the storage device.

In another embodiment of the present invention, a manometer is disposed below and adjacent to the filtering device in the storage device so as to monitor the pressure in the concentrated sludge. In another embodiment of the present invention, the sludge feed device further includes a pump, and the pump is provided at its front end or rear end with a mixer used for mixing an additive and sludge so as to mix the sludge to be treated with the additive. In another embodiment of the present invention, the sludge concentration and conditioning device may also comprise a sludge returning device used for conveying the sludge recovered from various devices downstream of the sludge concentration and conditioning device to the storage device of the sludge concentration and conditioning device.

The present invention also provides a method for treating sludge by using the aforesaid sludge concentration and conditioning device, comprising the steps of: continuously conveying sludge into the storage device by means of the sludge feed device; achieving solid-liquid separation of the sludge by the filtering device when the liquid level of the sludge in the storage device reaches the installation position of the filtering device, for the sake of sludge concentration; judging whether the amount of the concentrated sludge in the storage device is suitable according to the requirement of a conditioning step, and adjusting the amount of the concentrated sludge in the storage device by the concentrated sludge adjusting device if the amount of the concentrated sludge is too big; adding an additive into the concentrated sludge by means of the additive feed device so as to condition the sludge; and discharging the conditioned sludge from the storage device by means of the sludge discharging device as shown after concentration and conditioning.

In another embodiment of the present invention, after the step of discharging the concentrated and conditioned sludge from the storage device by means of the sludge discharging device as shown, the unconditioned, concentrated sludge in the adjusting tank is returned to the storage device for the purpose of conditioning. In another embodiment of the present invention, the sludge feed device also comprises a mixer used for mixing the additive with the sludge to be treated before its entry into the storage device, so as to further improve concentration efficiency. In another embodiment of the present invention, the method also comprises the step of conveying the sludge recovered from various devices downstream of the sludge concentration and conditioning device into the storage device so as to mix the recovered sludge with the sludge from the wastewater plant, and concentrating and conditioning them together.

BRIEF DESCRIPTION OF THE DRAWINGS

The embodiments of the present invention will be described in detail with reference to the drawings so as to facilitate sufficient comprehension and understanding of the above-mentioned and other objects, features and advantages of the present invention, wherein.

DETAILED DESCRIPTION OF THE INVENTION

It shall be apprehended that in order to display the contents clearly, the drawings herein are not drawn in proportion, and like or similar reference signs indicate like or similar components or portions. Moreover, it shall be apprehended that any embodiment described in the present application and technical features included therein can be combined to each other in suitable ways.

Figure 1:
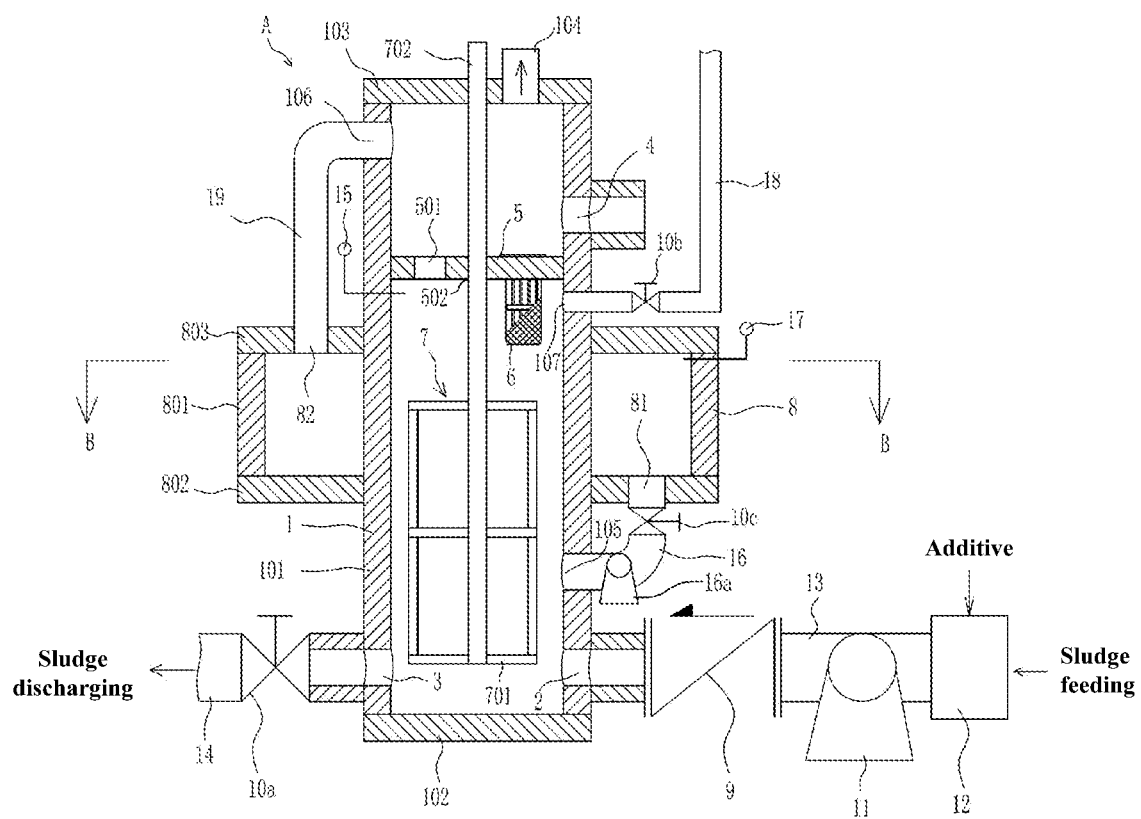
FIG. 1 illustrates an embodiment of a sludge concentration and conditioning device according to the present invention.

As shown in FIG. 1, it illustrates an embodiment of a sludge concentration and conditioning device A according to the present invention. The sludge concentration and conditioning device A comprises a storage device for receiving and temporarily storing sludge. In the embodiment shown in FIG. 1, the storage device is a container tank 1 including a wall 101, a base plate 102 and a cover 103. The wall 101, the base plate 102 and the cover 103 jointly form an interior space of the container tank for accommodating sludge. The container tank 1 can be made of any suitable material, such as a metallic material or a construction material like concrete, or the like. It can be easily apprehended that the container tank 1 may also have any other suitable form, such as a reservoir disposed in a ground depression. Correspondingly, such a reservoir has a reservoir wall, a bottom and a cover for covering the reservoir. In the embodiment shown in FIG. 1, the container tank 1 is substantially cylindrical. However, the container tank 1 may also have any other suitable shape as required, such as sphere, rectangle solid or cube, as long as it has an interior space that can accommodate sludge. The lower part of the wall 101 of the container tank 1 is respectively provided with a sludge inlet 2 and a sludge outlet 3. In the upper part of the wall 101 of the container tank 1 and above the sludge inlet 2, there is also disposed an overflow port 4 used for discharging filtrate generated in the sludge treatment process. Of course, it can be readily apprehended that the sludge inlet 2, the sludge outlet 3 and the overflow port 4 can also be disposed in other positions of the container tank 1 as required as long as the overflow port 4 is located higher than the sludge outlet 3. The overflow port 4 can be in direct communication with a wastewater treatment system of a wastewater plant so as to directly discharge the filtrate. However, the overflow port 4 can also be arranged as opening into the air for discharging gas from the interior space of the container tank 1. In doing so, a dedicated gas outlet can be saved. The sludge inlet 2 and/or the sludge outlet 3 can also be disposed in the base plate 102 of the container tank 1. The cover 103 of the container tank 1 can have an axle hole, through which a rotating shaft of such a device as a stirrer can pass. Moreover, the cover 103 can also be provided with a gas outlet 104 used for discharging gas from the interior space of the container tank 1.

The sludge concentration and conditioning device A further comprises a sludge feed device and a sludge discharging device. As shown in FIG. 1, the sludge feed device includes a sludge feed pipe 13, a pump 11 and a valve device 9, and the sludge discharging device includes a first control valve 10a and a sludge discharging pipe 14. The sludge discharging device can also include a corresponding pump as required. The sludge feed pipe 13 is connected to the sludge inlet 2, and the pump 11 can be disposed in the sludge feed pipe 13 and the sludge can be pumped by the pump 11 from the sludge feed pipe 13 through the sludge inlet 2 into the container tank 1. In the sludge concentration and conditioning device A as shown, the valve device 9 is used to control the sludge feed, and can be a valve or switch, such as a switch, check valve or adjusting valve. The valve device 9 disposed on the sludge feed device can better control the entry of sludge into the container tank 1. Additionally, the sludge inlet 2 is disposed in the lower part of the wall 101 of the container tank 1 or the base plate 102 of the container tank 1, and can, in conjunction with the valve device 9 in the sludge feed device, effectively prevent the sludge in the container tank 1 from refluxing into the sludge feed pipe 13. As shown in FIG. 1, a first control valve 10a is connected to the sludge outlet 3 and also to the sludge discharging pipe 14. The first control valve 10a can be operated to discharge the sludge from the container tank 1 via the sludge outlet 3 through the sludge discharging pipe 14. Furthermore, the sludge discharging pipe 14 may also be provided therein with a corresponding pump so that the pump cooperates with the first control valve 10a to discharge the concentrated sludge from the container tank 1 via the sludge outlet 3 through the sludge discharging pipe 14.

As shown in FIG. 1, the sludge feed device can include a mixer 12 disposed at the right side of the pump 11. The sludge to be treated from e.g. a sludge well can be pre-mixed by means of the mixer 12 and with the addition of the additive, so as to make the sludge to be treated uniformly mixed with the additive. After the pre-mixing, the pump 11 can be activated to convey the sludge mixed with the additive to the container tank 1. In another embodiment that is not shown, the mixer 12 can be disposed in a position between the sludge inlet 2 and the pump 11. Under such circumstances, the pump 11 is turned on to convey the sludge to be treated into the mixer 12, into which the additive is added to make the sludge mixed with the additive more sufficiently. When the moisture content of the sludge is up to the concentration requirement, the feed of the additive can be stopped and the sludge will be pumped into the container tank 1. Of course, it can be easily understood that the mixer 12 is not a requisite. In some cases, the sludge feed device may not include the mixer 12.

The sludge concentration and conditioning device A as shown in FIG. 1 is also provided with a filtering device for filtering sludge so as to achieve solid-liquid separation. The filtering device is disposed in the container tank 1, and located between the overflow port 4 and the sludge inlet 2 and adjacent to the overflow port 4. In the embodiment shown in FIG. 1, the filtering device includes a support plate 5 and a corresponding filtering assembly 6. A filter mesh 61 in the filtering assembly 6 can be made of a filtering cloth that only allows the passage of liquid, or made of a biological membrane, a metallic mesh or any other possible material. In the sludge treatment process, for the sake of reduced concentration time and improved concentration efficiency, the sludge to be treated can be added with the additive, so that the sludge reacts with the additive and the sludge particles continuously flocculate and cluster under the action of the additive. The sludge particles themselves carry negative charges and repel each other, and additionally, a water layer is adhered to the surface of the sludge particles due to the hydration to further prevent the binding between the sludge particles, so stable colloidal flocculates can be finally formed. Additive added into the sludge has the effect of charge neutralization or absorption bridging on the sludge particles in the sludge, so as to destroy the stability of the colloidal sludge particles and make the disperse and small sludge particles cluster into big ones. When the sludge is continuously fed into the container tank 1 through the sludge inlet 2, the liquid in the sludge is continuously passing through the filtering device and discharged via the overflow port 4, and the sludge particles are intercepted below the filtering device, thereby achieving a quick solid-liquid separation and further shortening the concentration time. As shown in FIG. 1, in a position on the wall 101 of the container tank 1 and below and adjacent to the filtering device is there disposed a manometer 15 used for measuring the pressure in the concentrated sludge. As the concentration of the concentrated sludge increases, the pressure also rises accordingly. Thus, the current concentration state of the sludge can be obtained by measuring the pressure. When the reading of the manometer 15 reaches a set value, it is deemed that the sludge in the container tank 1 has got a desired concentration. Therefore, the pump 11 in the sludge feed device can be turned off to stop conveying the sludge into the container tank 1. The concentration process of sludge is done.

As shown in FIG. 1, the sludge concentration and conditioning device A further comprises an additive feed device used for conveying an additive into the container tank 1 so as to mix the additive with the concentrated sludge, thereby conditioning the sludge. In the embodiment shown in FIG. 1, the additive feed device includes a second control valve 10b and an additive conveying pipe 18. The second control valve 10b is connected to an additive receiving opening 107 in the wall 101 of the container tank 1, and the additive receiving opening 107 is located below the filtering device and above the sludge inlet 2. When the sludge conveyed into the container tank 1 has been concentrated and has got a desired concentration, the second control valve 10b is opened so as to convey the additive into the concentrated sludge in the container tank 1 via the additive conveying pipe 18, the second control valve 10b and the additive receiving opening 107, for the purpose of conditioning the concentrated sludge. It shall be understood that FIG. 1 only schematically shows one additive conveying pipe 18. Those skilled in the art can, however, readily realize that the additive feed device can include more than one additive conveying pipe as required, in order to convey different additives into the storage device.

The embodiment shown in FIG. 1 is also provided with a stirring device 7. The stirring device 7 includes a rotating shaft 702 and a blade 701 located at an end of the rotating shaft 702. In the shown embodiment, the blade 701 is formed by a plurality of rod-like components connected together in a suitable manner, such as by welding or bolting. But it can be easily apprehended that the blade 701 can have any suitable form, for example, it may be arranged in a shape having a paddle (e.g. a spiral paddle). The rotating shaft 702 is arranged through an axle hole of the cover 103 and a central hole 502 in the support plate 5 of the filtering device along a central longitudinal axis of the container tank 1, and the blade 701 in the container tank 1 is disposed between the filtering device and a base plate 102 of the container tank 1. The rotating shaft 702 is connected with a power device (not shown) by a transmission device (not shown). When stirring is required, the power device is activated to drive the rotating shaft 702 in rotation, and the rotating shaft 702 rotates with the blade 701 so as to stir the sludge.

Through stirring by the stirring device 7, the sludge and additive can react in an accelerated speed and be mixed evenly. The stirring device 7 can be used to mechanically stir the sludge in the concentration phase to facilitate the concentration of sludge, and also be used to mechanically stir the sludge in the conditioning phase so as to enable the concentrated sludge to sufficiently react with the additive. After the conditioning is completed, the stirring device 7 is ceased. Thereafter, the first control valve 10a is opened to allow the concentrated and conditioned sludge to discharge through the sludge outlet 3, the first control valve 10a and the sludge discharging pipe from the container tank 1, so as to enter into the sludge reservoir or the next mechanical dehydration process. However, it can be readily apprehended that the stirring device 7 is not a requisite. According to actual conditions, the sludge concentration and conditioning device may not comprise the stirring device 7. Moreover, the blade of the stirring device 7 may be shaped and configured in any other suitable form according to actual demands.

It shall also be explained that in the embodiment of the present application that is not shown, the wall 101 of the container tank 1 may not include a sludge inlet 2 disposed thereon. Instead, the sludge feed pipe 13 of the sludge feed device passes from the top of the container tank 1, such as through the cover 103, and correspondingly through the filtering device, and extends below the filtering device, such as to a place adjacent to the base plate 102 of the container tank 1, in a way adhering to the wall 101 of the container tank 1. In this case, the sludge inlet 2 is the open end of the sludge feed pipe 13 extending below the filtering device, thereby being able to convey the sludge below the filtering device into the container tank 1. Furthermore, the wall 101 of the container tank 1 may not include an additive receiving opening disposed thereon. Instead, the additive conveying pipe 18 of the additive feed device also passes from the top of the container tank 1, such as through the cover 103, and correspondingly through the filtering device, and extends below the filtering device in a way adhering to the wall 101 of the container tank 1, thereby being able to convey the additive below the filtering device into the container tank 1. In this case, the additive opening is the open end of the additive conveying pipe 18 extending below the filtering device.

FIG. 1 also shows a concentrated sludge adjusting device including an adjusting tank 8, a third control valve 10c, pipelines 16 and 19, and a pump 16a. The adjusting tank 8 includes a wall 801, a base plate 802 and a top plate 803, and is arranged to surround the container tank 1. Thus, the base plate 802 and the top plate 803 are both arranged to have a central hole for the passage of the container tank 1. The wall 801 is connected between the base plate 802 and the top plate 803, thereby forming, together with the base plate 802 and the top plate 803, an interior space of the adjusting tank 8 for accommodating sludge. The base plate 802 is provided therein with an orifice 81, which is connected to an opening 105 in the wall 101 of the container tank 1 through the third control valve 10c and the pipeline 16. The opening 105 is located in the lower part of the wall 101. The pump 16a is arranged in the pipeline 16 for pumping the concentrated sludge in the container tank 1 into the adjusting tank 8 and for returning the sludge in the adjusting tank 8 to the container tank 1. The top plate 803 is also provided therein with an orifice 82, which is connected to an opening 106 in the wall 101 of the container tank 1 through the pipeline 19. The opening 106 is located in the upper part of the wall 101 and above the filtering device. Gas in the adjusting tank 8 can be discharged through the orifice 82. In another embodiment, the pipeline 19 can be omitted, so that the orifice 82 is directly arranged as opening into the air to discharge the gas in the adjusting tank 8. The wall 801 of the adjusting tank 8 is also provided with a content gauge 17 for measuring the liquid level of the sludge in the adjusting tank 8. When the liquid level of the sludge reaches the position of the content gauge 17, the pump 16a is ceased, and meanwhile the third control valve 10c is closed to stop pumping the concentrated sludge into the adjusting tank 8.

Moreover, in another embodiment, the concentrated sludge adjusting device according to actual demands may not include the pump 16a. Instead, the adjusting tank 8 is directly arranged at a suitable height with respect to the container tank 1 so as to send the concentrated sludge into the adjusting tank and later discharge the concentrated sludge from the adjusting tank 8 by means of gravity. For instance, the base plate 802 of the adjusting tank 8 is in height below the filtering device in the container tank 1, e.g., located in the lower part of the container tank 1. Therefore, when the concentration is completed, the third control valve 10c is opened and the sludge in the container tank 1 can enter into the adjusting tank 8 by means of gravity. When the sludge in the adjusting tank 8 reaches the position of the content gauge 17, the third control valve 10c is closed. When the sludge in the adjusting tank 8 needs to be discharged, the sludge in the container tank 1 is first evacuated and then the third control valve 10c is opened to allow the sludge in the adjusting tank 8 to be discharged from the adjusting tank 8 into the container tank 1. In an embodiment of the present invention, the space of the container tank 1 below the base plate 802 of the adjusting tank 8 has a volume greater than or equal to that of the adjusting tank 8, such that the sludge in the adjusting tank 8 can be fully discharged into the container tank 1.

Figure 2:
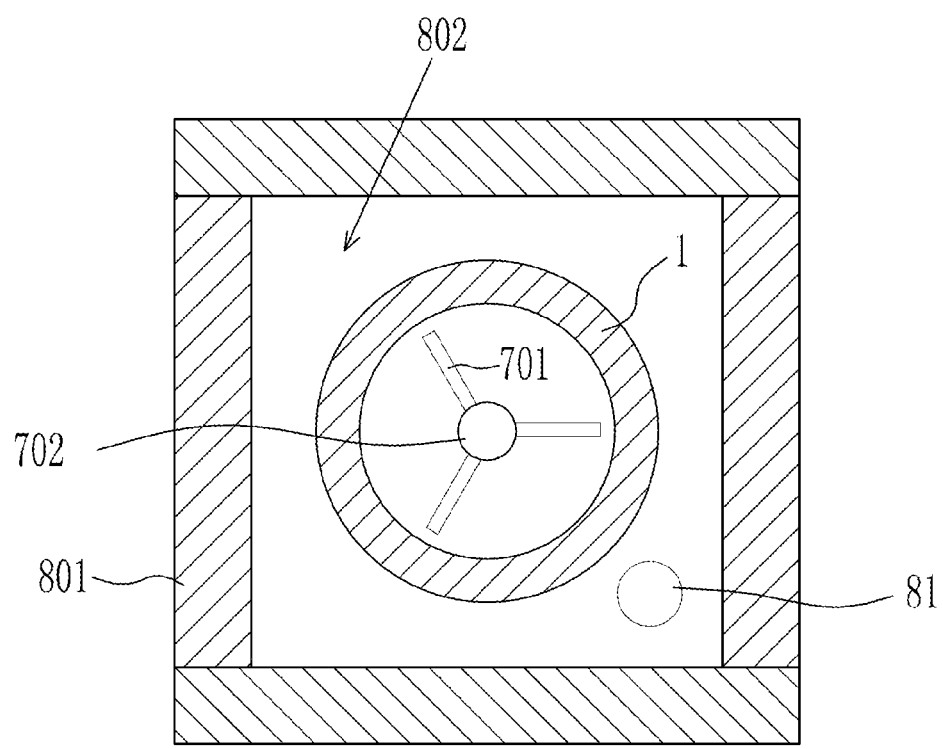
FIG. 2 is a cross-sectional view taken along the line B-B of FIG. 1.

With reference to FIG. 2, it shows a cross-sectional view of the sludge concentration and conditioning device taken along the line B-B in FIG. 1. As shown in FIG. 2, the wall 801 of the adjusting tank 8 is substantially square in cross section, and is formed by four plates connected to each other. However, it can be readily apprehended that the wall 801 of the adjusting tank 8 may also have a cross section of other shape, such as a circle. The wall 801 of the adjusting tank 8 may be formed by any number of plates, or can be in a cylindrical shape formed of one plate, or the base plate 802, the wall 801 and the top plate 803 of the adjusting tank 8 can be integrally formed. The adjusting tank 8 as a whole can be in other shape, like cube or rectangular solid or sphere or cylinder. Additionally, the adjusting tank 8 can be made of any suitable material, such as a metallic material or a construction material like concrete, or the like.

The concentrated sludge adjusting device is used to allow the concentrated sludge partially into the adjusting tank 8 after the sludge concentration and conditioning device A finishes the concentration of the sludge, to thereby adjust the amount of the concentrated sludge in the container tank 1 of the sludge concentration and conditioning device A according to the conditioning requirements in order to achieve a satisfactory conditioning effect. When the conditioned sludge is discharged through the sludge outlet 3, the unconditioned sludge in the adjusting tank 8 of the concentrated sludge adjusting device can be re-sent into the container tank 1 of the sludge concentration and conditioning device A for the sake of next conditioning or direct discharge. In addition, while the concentrated sludge enters into the adjusting tank 8, the liquid level in the container tank 1 drops down to a position below the filtering device, during which a portion of filtrate that is not discharged through the overflow port 4 also decreases therewith. The filtrate flushes a filtering assembly (especially a filter mesh) in the filtering device to remove some sludge adhering to the filter mesh, to thereby clean the filtering device.

Figure 3:
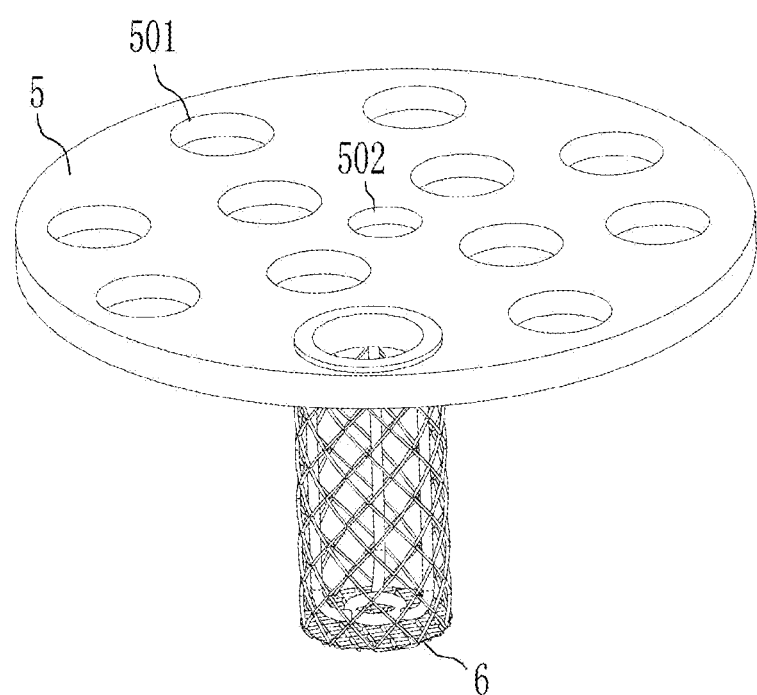
FIG. 3 illustrates a filtering device in FIG. 1.

Now with reference to FIG. 3, it shows an embodiment of the filtering device in the sludge concentration and conditioning device A in FIG. 1. In the embodiment, the filtering device includes the support plate 5 and the filtering assembly 6. The support plate 5 is a plate having a substantially flat shape, and has a peripheral contour thereof designed to adapt to the inner circumferential contour of the wall 101 of the container tank 1, so as to be put into the container tank 1. In addition to the central hole 502 for the passage of the rotating shaft 701 of the stirring device 7, the support plate 5 is also provided with at least one plate hole 501 which allows the passage of the filtered liquid in the course of sludge concentration. The plate hole 501 can be regularly or irregularly arranged and have any suitable shape, such as circle, triangle or polygon, or the like. For each plate hole 501 in the support plate 5, there is correspondingly disposed one filtering assembly 6 for filtering the sludge. The filtering assembly 6 includes the filter mesh 61 and a cage bracket 62. The filter mesh 61 can be made of a filtering cloth that only allows the passage of liquid, or made of a biological membrane, a metallic mesh or any other possible material.

Figure 4:
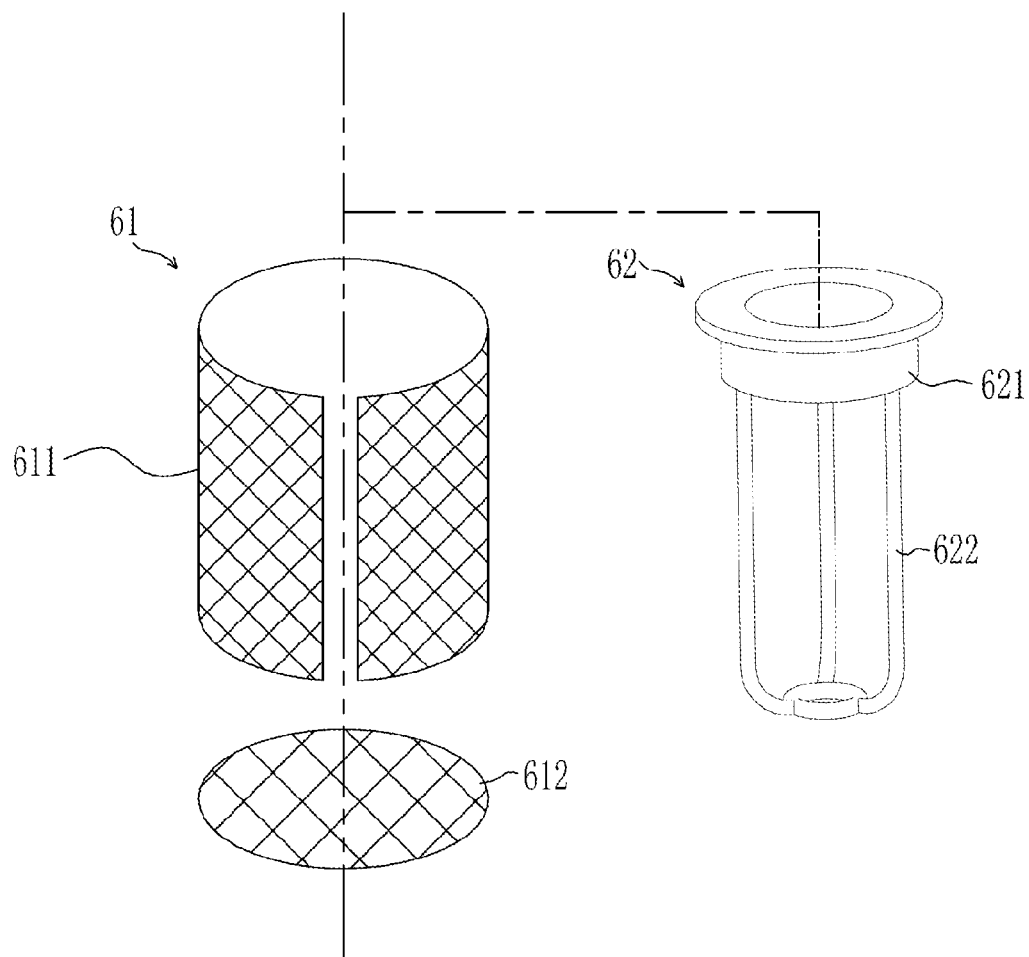
FIG. 4 is an exploded view of a filtering assembly in the filtering device in FIG. 3.

As shown in FIG. 4, the filter mesh 61 includes a mesh cylinder 611 and a bottom mesh 612, and the cage bracket 62 includes a fastener 621 and at least one filtering grid 622. However, it can be readily envisaged that the filter mesh 61 may be a one-piece, or the fastener 621 and the filtering grid 622 may also be integrally formed, or the filter mesh 61, the fastener 621 and the filtering grid 622 may also be integrally formed. The fastener 621 is used to join the filtering assembly 6 to the plate hole 501 in the support plate 5. The fastener 621 can be joined to the plate hole 501 in any suitable manner, such as bolting, welding, adhesion by gluing or locking by a suitable locking device. The filtering grids 622 are each connected at one end to the fastener 621 and connected at the other end to one another by a connecting ring. The filtering grids 622 are used to support and fasten the filter mesh 61 so as to prevent the folding, deformation or plugging of the filter mesh 61 as a result of sludge pressure or impact. Those skilled in the art can easily understand that the number and shape of the filtering grids 622 can be selected according to actual demands. In addition, the support plate 5 and the filtering assembly 6 can be integrally formed by those skilled in the art.

Figure 5:
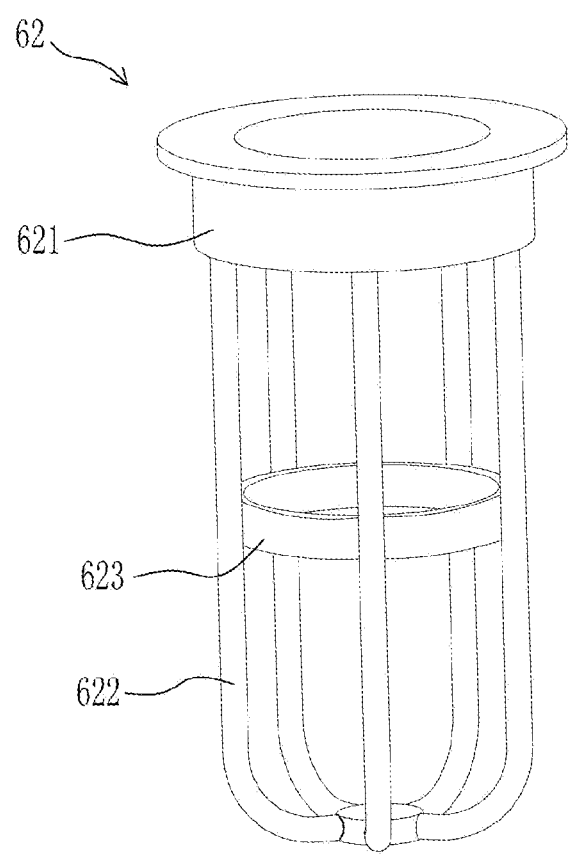
FIG. 5 is another embodiment of a cage bracket in the filtering assembly.

In the embodiment shown in FIG. 4, there are three filtering grids 622. However, those skilled in the art can select any suitable number and any suitable shape according to actual conditions. FIG. 5 shows another embodiment of the cage bracket 62 of the filtering assembly 6. In the embodiment, the cage bracket 62 includes five filtering grids 622 and is also provided in its longitudinal direction with at least one reinforcing ring 623 in the middle of the filtering grids. The at least one reinforcing ring 623 is fixedly connected with each of the filtering grids to reinforce the strength of the cage bracket 62.

In the embodiment of the filtering device shown in FIG. 3 of the present application, the support plate 5 is a flat plate having a circular shape. However, it can be envisaged that the support plate 5 can have any other suitable shape, such as an upwardly curved convex shape, or a downwardly curved concave shape, or an undulating shape. Moreover, in an embodiment that is not shown, the filtering grids 622 can have a length adjustable according to different sludge characteristics and concentration requirements, and the filtering assembly 6 with a different length can be used according to different sludge conditions and concentration requirements.

In an unshown embodiment of the present application, the sludge concentration and conditioning device may also comprise a sludge returning device. The sludge returning device includes one or more returned sludge inlets, a returned sludge outlet, a gas outlet and a separation device. The one or more returned sludge inlets are respectively connected at one end to the separation device and connected at the other end to sludge collection devices in various apparatuses downstream of the sludge concentration and conditioning device for conveying the sludge recovered from these apparatuses by the sludge collection device to the separation device. For instance, the sludge recovered from these apparatuses is conveyed to the separation device by high-pressure gas. The separation device is used to separate the recovered sludge, e.g., to separate the recovered sludge from the high pressure gas carrying the sludge. In an embodiment, the separation device is a cyclone separation device. In another embodiment, the separation device may be a device which only includes a filter (e.g., a filter mesh) disposed in a gas flow path. Under such circumstances, gas flows through the filter and the sludge carried thereby is stopped by the filter to be separated from the gas. The returned sludge outlet is connected at one end to the separation device, and at the other end to the container tank and below the filtering device of the sludge concentration and conditioning device. The gas outlet is connected at one end to the separation device and at the other end to the upper part of the container tank (above the filtering device) or connected to a gas circulation pipeline used for recovering the high pressure gas. In doing so, the gas separated from the sludge is discharged or recovered through the gas outlet, and the recovered sludge can be sent into the sludge concentration and conditioning device for treatment. With the sludge returning device, the sludge concentration and conditioning device can treat not only sludge with high moisture content from a wastewater plant, but also sludge from various apparatuses downstream of the entire sludge treatment production line. Thus, there is no need to additionally dispose an extra sludge recovery or treatment device in the sludge treatment production line, which greatly saves costs in, e.g., land, construction and apparatuses.

Furthermore, in some other embodiments that are not shown in the present application, the position of the filtering device in the storage device or container tank is adjustable up and down, so as to adjust the size of the space defined in the storage device by the bottoms of the filtering device and the storage device (or adjust the division of the internal space of the storage device by the filtering device). The size of the space can affect the time spent from the start of sludge conveyance to the completion of sludge concentration. The larger the space is, the longer time it takes; the smaller the space is, the shorter time it needs. Of course, the amount of concentrated sludge will decrease accordingly. Thus, the position of the filtering device in the storage device can be adjusted in use according to demands. Moreover, in another embodiment of the present invention, the filtering device can just be a filter mesh.

With the filtering device of the present invention, the manufacture difficulty and maintenance cost of the filtering device can be greatly reduced. For instance, the support plate 5 can provide sufficient strength over the entire cross-sectional area of the container tank 1 so as to resist against the pressure and impact imposed by sludge in the concentration process and to prevent the support plate from deformation or damage. The filtering assembly joined to the plate hole 501 in the support plate 5 has the cage bracket 62, which provides sufficient strength for the filtering assembly 6 so as to prevent the filtering assembly from deformation or folding resulting from the impact and pressure on the filtering assembly imposed by the sludge in the container tank 1. The filter mesh 61 includes a mesh cylinder 611 surrounding the cage bracket 62 and a bottom mesh 612. Thus, the filtering assembly 6 has a certain extension in the lengthwise direction, thereby ensuring a sufficient filtering area, improving a filtering efficiency and shortening the time required for concentration. When the filtering assembly is broken or needs to be replaced according to actual working conditions, it is only required to remove the corresponding filtering assembly from the support plate 5 for maintenance or replacement, with no need of changing the entire filtering device, which can greatly reduce the maintenance cost.

Figure 6:
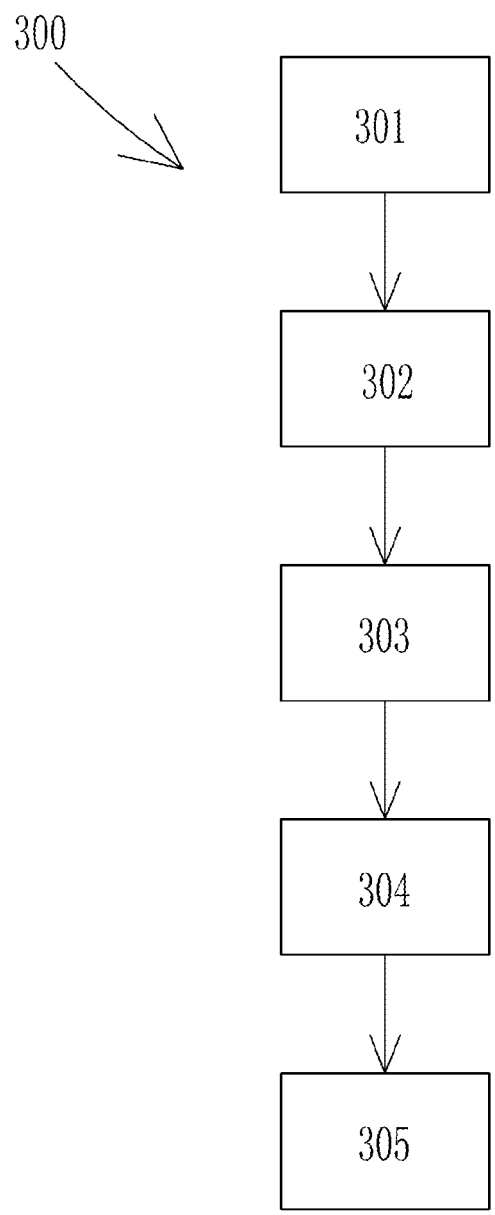
FIG. 6 illustrates an embodiment of a method for concentrating and conditioning sludge by using the sludge concentration and conditioning device according to the present invention.

Now with reference to FIG. 6, it shows a preferred embodiment of a method 300 for concentrating and conditioning sludge by using the sludge concentration and conditioning device according to the present invention shown in FIG. 1. The method 300 for concentrating and conditioning sludge according to the embodiment can be carried out in the following manner.

In the block 301, the pump 11 and the valve device 9 in the sludge feed pipe 13 of the sludge feed device are activated to pump the sludge to be treated from, e.g., a sludge well, along the sludge feed pipe 13 via the sludge inlet 2 to the container tank 1; and as the sludge is continuously conveyed to the container tank 1 from the sludge feed pipe 13 via the sludge inlet 2, the sludge in the container tank 1 constantly increases such that the liquid level of the sludge gradually rises.

In the block 302, when the liquid level of the sludge reaches the installation position of the filtering device, such as the installation position of the filtering assembly 6 of the filtering device, the sludge is still continuously conveyed into the container tank 1, the filter mesh 61 of the filtering device only allows the passage of liquid and thereby prevents the sludge out of the filter mesh 61 to achieve the solid-liquid separation, and the filtrate filtered in the upper part is directly discharged through the overflow port 4. The sludge to be treated can continuously enter through the sludge inlet 2 so as to achieve continuous concentration thereof in the container tank 1 without waiting for the sludge-liquid stratification, and can be directly filtered in the upper part with the filtrate being discharged. When the reading of the manometer 15 on the housing 101 of the container tank 1 reaches a set value, it indicates that the sludge concentration has reached a desired level correspondingly, and then the pump 11 and the valve device 9 on the sludge feed pipe 13 are closed. At this time, the concentration process is finished.

In the block 303, the third control valve 10c is opened to send the concentrated sludge in the container tank to the adjusting tank 8 in the concentrated sludge adjusting device via the opening 105, the pipeline 16, the third control valve 10c and the orifice 81 by the pump 16a or under the action of gravity only, until the amount of concentrated sludge in the container tank 1 satisfies the requirement. Thus, the amount of concentrated sludge in the container tank 1 can be adjusted. After the adjustment of the concentrated sludge is finished, the third control valve 10c is closed.

In the block 304, the conditioning process is carried out. In the conditioning process, the second control valve 10b on the additive conveying pipe 18 is opened so as to add the additive for conditioning the concentrated sludge in a fixed quantity into the container tank 1, and meanwhile the stirring device 7 can be activated as required so as to mechanically stir the concentrated sludge in the conditioning phase for the purpose of making the concentrated sludge sufficiently react with the additive. When the sludge achieves the conditioning effect, the second control valve 10b and the stirring device 7 are closed. At this time, the conditioning process is finished.

In the block 305, when the concentration process and the conditioning process are completely finished, the first control valve 10a on the sludge discharging pipe is opened so as to discharge the concentrated and conditioned sludge in the container tank 1 through the sludge outlet 3 into, e.g., a sludge pool for temporary storage, or to directly convey the sludge to a mechanical dehydration process that is not shown. Subsequently, the first control valve 10a on the sludge discharging pipe is closed and the third control valve 10c is opened so as to discharge the concentrated sludge stored in the adjusting tank 8 into the container tank 1. Then, this part of the concentrated sludge can either be discharged via the sludge outlet 3 or be subject to the conditioning process again.

Furthermore, in an embodiment of the present invention, the method 300 for concentrating and conditioning the sludge may also comprises the following steps: sending the sludge recovered from various apparatuses downstream of the sludge concentration and conditioning device into the container tank 1, mixing the recovered sludge with the sludge from a wastewater plant, and concentrating and conditioning them together.

Moreover, it shall be pointed out that flocculated concentration can be conducted after the concentration process and prior to the conditioning process. The main reason is that the sludge is highly hydrophilic, water in sludge is strongly bonded with sludge particles. An additive (such as a flocculant) can be added to change the property of sludge, destroy the structure of sludge colloids and reduce the hydrophilia of sludge with water, thereby improving the dehydration performance of sludge to make the sludge separated from water more thoroughly. Hence, if the concentration effect of the concentration process is not satisfactory, the second control valve 10b on the additive conveying pipe 18 can be opened to add such an additive as a flocculant into the container tank 1, and meanwhile the stirring device can be activated as required so that the additive can sufficiently react with the sludge with the constant stirring by the stirring device, for the sake of flocculated concentration. By way of the flocculated concentration, the sludge can reach a desired concentration and then be subject to the conditioning process.

In the sludge concentration and conditioning device, as well as the concentration and conditioning processes, according to the present invention, the conveyance of sludge and discharge of filtrate are conducted continuously in the course of concentration, with no need of separation and sedimentation of sludge from water. Continuous conveyance of sludge into the reservoir accelerates the flocculation or concentration of sludge. Additionally, with the help of the filtering device disposed in the upper part of the container tank 1, continuous conveyance of sludge and filtration in the upper part enable the sludge to be concentrated in an active sludge concentration manner achieved by the solid-liquid separation and continuous sludge feed through the filtering device, instead of in a passive natural sedimentation manner commonly used in the prior art, which can greatly shorten the time required for sludge concentration and achieves an unexpected technical effect. For instance, by utilizing the device and method of the present invention, the time required for sludge concentration can be reduced from more than ten hours to less than two hours. Moreover, since the sludge is highly hydrophilic and water in sludge is strongly bonded with sludge particles, an additive can be added to change the property of sludge, destroy the structure of sludge colloids and reduce the hydrophilia of sludge with water, thereby improving the dehydration performance of sludge to make the mud separated from water more thoroughly. Furthermore, the concentrated sludge adjusting device can be used so that the amount of the concentrated sludge in the container tank 1 of the sludge concentration and conditioning device A can be adjusted according to the conditioning requirement prior to the conditioning process, in order to achieve a satisfying conditioning effect. The adjusting tank 8 in the concentrated sludge adjusting device is arranged to surround the container tank 1 so that the sludge concentration and conditioning device according to the present invention has a compact structure and occupies a smaller area, which is certainly favourable to the implementation of the sludge concentration and conditioning device according to the present invention.

So far, those skilled in the art shall realize that the embodiments as stated above are only preferred embodiments of the present invention, not the entirety of the solutions of the present invention, wherein any variations or modifications of the embodiments of the present invention shall fall within the scope of concept of the present invention.

The invention claimed is:

1. A sludge concentration and conditioning device comprising:
    a storage device for receiving and accommodating sludge, the storage device including a body and a cover that jointly form an interior space of the storage device for receiving and accommodating the sludge, the body being provided with a sludge outlet for discharging the sludge from the storage device and an overflow port located above the sludge outlet and used for discharging filtrate generated in a sludge concentration process;
    a filtering device disposed between the sludge outlet and the overflow port within the storage device, the filtering device configured to filter the sludge within the storage device to accommodate passage of liquid, and prevent passage of sludge particles, through the filtering device so as to achieve solid-liquid separation;
    a sludge feed device used for conveying the sludge from below the filtering device into the storage device;
    an additive feed device used for conveying an additive from below the filtering device into the storage device so as to mix the additive with the sludge;
    a sludge discharging device connected to the sludge outlet and used for discharging concentrated and conditioned sludge from the storage device; and
    a concentrated sludge adjusting device including an adjusting tank located below the filtering device and in fluid communication with the storage device, the concentrated sludge adjusting device being used for adjusting an amount of concentrated sludge in the storage device according to conditioning requirements, wherein the adjusting tank is arranged to surround the body of the storage device;
   wherein the body of the storage device is a container disposed on a ground and including a sidewall and a bottom that are formed of a housing;
   the sludge outlet is located below the filtering device, the overflow port is located above the filtering device, the storage device further comprises a sludge inlet located below the filtering device;
   the filtering device includes: a support plate including at least one plate hole,
   a filtering assembly correspondingly disposed at the at least one plate hole in the support plate; and
   the adjusting tank of comprising a wall, a top plate and a base plate.

2. The sludge concentration and conditioning device according to claim 1, wherein the top plate and the base plate both have a central hole for passage of the body of the storage device, the top plate also has an orifice, which is connected to an upper part of the body through a pipeline, and the base plate also has an orifice, which is connected to an opening in a lower part of the body of the storage device via a control valve and another pipeline.

3. The sludge concentration and conditioning device according to claim 2, wherein the concentrated sludge adjusting device further comprises a pump disposed in the another pipeline in communication with the orifice in the base plate and used for pumping the concentrated sludge.

4. The sludge concentration and conditioning device according to claim 1,
   wherein the sludge outlet and the overflow port are located in the sidewall; or
   wherein the sludge outlet is located in the bottom, and the overflow port is located in the sidewall.

5. The sludge concentration and conditioning device according to claim 1,
   wherein the sludge inlet is located in the sidewall or bottom of the body, and the sludge feed device is connected to the sludge inlet so as to convey the sludge from below the filtering device; or
   wherein the sludge feed device includes a sludge feed pipe extending from top to bottom along the sidewall of the body in the storage device to below the filtering device so as to convey the sludge from below the filtering device.

6. The sludge concentration and conditioning device according to claim 1, wherein the cover of the storage device further includes a gas outlet used for discharging gas from the storage device.

7. The sludge concentration and conditioning device according to claim 1,
   wherein the storage device further includes an additive inlet located below the filtering device, and the additive feed device is connected to the additive inlet so as to convey the additive from below the filtering device; or
   wherein the additive feed device includes an additive pipe extending from top to bottom along the body within the storage device to below the filtering device so as to convey the additive from below the filtering device.

8. The sludge concentration and conditioning device according to claim 1, further comprising a stirring device used for stirring the sludge in the storage device.

9. The sludge concentration and conditioning device according to claim 1, wherein the filtering assembly including:
   a cage bracket that includes a fastener and a plurality of filtering grids, the fastener being used for joining the filtering assembly to the at least one plate hole of the support plate and the plurality of filtering grids being each fixedly connected at one end to the fastener and connected at the other end to one another; and
   a filter mesh fastened to the cage bracket and surrounding the cage bracket.

10. The sludge concentration and conditioning device according to claim 9, wherein the at least one plate hole in the support plate is one of regularly arranged in the support plate, irregularly arranged in the support plate, or in a shape of a circle, a triangle or a polygon.

11. The sludge concentration and conditioning device according to claim 9,
   wherein the support plate is a flat plate; or
   wherein the support plate has an upwardly curved convex shape, or a downwardly curved concave shape, or an undulating shape.

12. The sludge concentration and conditioning device according to claim 9,
   wherein the filter mesh includes a mesh cylinder and a bottom mesh that are connected to each other so as to jointly surround the cage bracket; or
   wherein the filter mesh is formed into one piece.

13. The sludge concentration and conditioning device according to claim 9, wherein the cage bracket is provided in its longitudinal direction with at least one reinforcing ring in a middle of the plurality of filtering grids.

14. The sludge concentration and conditioning device according to claim 9, wherein the plurality of filtering grids can have a length adjustable according to different sludge characteristics and concentration requirements, such that filtering assemblies of various lengths can be adopted according to the different sludge characteristics and concentration requirements.

15. The sludge concentration and conditioning device according to claim 1, wherein the filtering device can move up and down as required so as to adjust division of the interior space of the storage device.

16. The sludge concentration and conditioning device according to claim 1, wherein a manometer is disposed below and adjacent to the filtering device in the storage device so as to monitor pressure in the concentrated sludge.

17. The sludge concentration and conditioning device according to claim 1, wherein the sludge feed device further includes a pump, and the pump is provided at its front end or rear end with a mixer used for mixing the additive and sludge so as to mix the sludge to be treated with the additive.

18. A method for treating sludge by using a sludge concentration and conditioning device according to claim 1, said method comprising:
   continuously conveying the sludge into the storage device by means of the sludge feed device;
   continuously conveying the sludge when a liquid level of the sludge in the storage device reaches an installation position of the filtering device, so as to achieve the solid-liquid separation of the sludge by the filtering device for the sake of sludge concentration;
   after the sludge concentration, adjusting the amount of the concentrated sludge in the storage device by the concentrated sludge adjusting device to thereby decreasing the liquid level of the concentrated sludge in the storage device;

adding the additive into the concentrated sludge by means of the additive feed device so as to condition the sludge; and after concentration and conditioning, discharging the conditioned sludge from the storage device by means of the sludge discharging device and then discharging the concentrated sludge stored in the concentrated sludge adjusting device.

19. The method according to claim 18, wherein the sludge feed device also comprises a mixer used for mixing the additive with the sludge to be treated before its entry into the storage device.

20. The method according to claim 18, wherein the concentrated sludge in the storage device is sent into the adjusting tank in the concentrated sludge adjusting device by a pump or under the action of gravity only, until the amount of concentrated sludge in the storage device satisfies the conditioning requirements.

\* \* \* \* \*